J. Potter,
Bed Bottom.
No. 98,520. Patented Jan. 4, 1870.
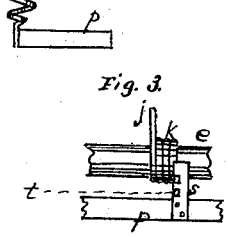
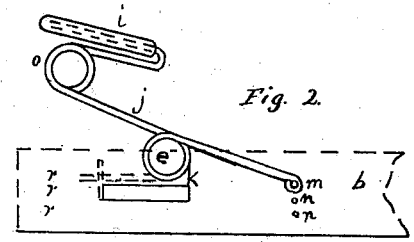
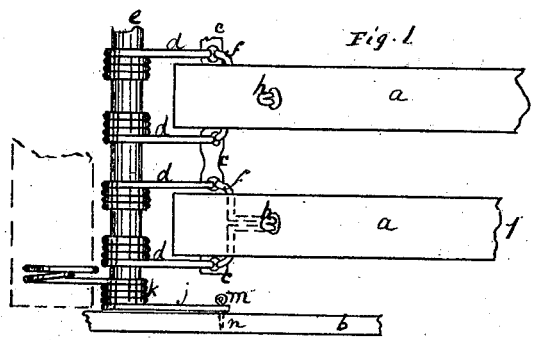
Witness
Henry C. Houston
Wm. Franklin Seavey
Inventor
James Potter
Per W. H. Clifford, Atty.

UNITED STATES PATENT OFFICE.

JAMES POTTER, OF PORTLAND, MAINE.

IMPROVED BED-BOTTOM.

Specification forming part of Letters Patent No. 98,520, dated January 4, 1870.

*To all whom it may concern:*

Be it known that I, JAMES POTTER, of Portland, in the county of Cumberland and State of Maine, have invented a new and useful Improved Bed; and I hereby declare the following to be a full, clear, and exact description thereof, which will enable others to make and use my invention, reference being had to the accompanying drawings, forming part of this specification, in which—

Figure 1 shows a top view of a portion of a bed-bottom with certain of my improvements thereon. Fig. 2 is an inside view of part of the side of a bed-bottom with a portion of my improvements thereon. Fig. 3 is an end view of a part of a bed-bottom to be more particularly described hereinafter. Fig. 4 is a side elevation of one form of my improved bolster.

My invention has for one of its objects to provide an improved method of attaching the removable slats of a bed-bottom to the springs thereof.

The second general purpose of my invention is to provide an improved bolster, or a substitute for a bolster, for a bed.

$a$ shows the slats of a bed; $b$, the side pieces of the bottom thereof; $d$, wire rods or springs, which are coiled around the roller $e$ at the ends of the bed, as common. These rods extend a little beyond the roller $e$, as shown in Fig. 1, and then have hooks formed on their ends, which hooked ends are inserted into holes made in the flexible pieces or connections $c$. Also, inserted into these holes in the pieces $c$ are the hooked ends of the pieces $f$, as shown also in Fig. 1. The form of these pieces $f$ is shown by dotted lines in Fig. 1 on the bed-slat numbered 1. These parts $f$ are on the under side of the slats, and have a hooked end, $h$, which is inserted through a hole in the end or near the end of the slat, and overlaps slightly the said slat on the top side thereof. This forms a secure and elastic connection, and when the slat is pressed downward by superimposed weight the hook $h$, pressing upon the top side of the slat, serves to confine it more securely.

The second part of my improvement relates to what I have already denominated the "bolster," or substitute therefor. The bolster-piece is represented at $i$, and may be of any proper material. Supporting this is a spring-rod, $j$, which is attached to the inside of the side pieces of the bed, (see Fig. 2,) and, as shown, is adjustable by means of an eye and a removable pintle, $m$, said pintle fitting into holes $n$. As shown in Fig. 2, the rod $j$ is then coiled around the roller $e$ at $k$, formed into a coil-spring at $o$, and then attached to the bolster-piece $i$ by being inserted into holes therein, as shown. As the eye $m$ is lowered into any of the successive holes, the bolster-piece $i$ is raised, and vice versa. This renders the bolster adjustable.

Instead of being coiled around $e$, the rod $j$ may have a piece extend down to $r$ in Fig. 2, and there have an eye, pintle, and holes similar to $m$ $n$, and so be adjustable. In that case springs would have to be applied immediately under the bolster-piece $i$ in order to give it elasticity. These springs, of course, can be either helical, elliptical, or otherwise.

Another form of the bolster is shown in Fig. 4 in the side elevation. This consists of a tapering helical spring coming to a point, which point is inserted into a hole in the cross-piece at the head of the bed.

When it is desirable to have the bolster-piece $i$ in two separate parts, similar to two separate pillows on a bed, the arrangement in Fig. 4 is very convenient; but the same arrangement can also be applied to the form shown in Fig. 2 by means of the devices indicated in Fig. 3.

$s$ shows a piece of metal fastened to the cross-piece $p$ of the bed-frame, and having in it little notches $t$.

Instead of being attached to the side piece, $b$, as illustrated at $m$ $n$ in Fig. 2, the rod $j$ in Fig. 3 has its end inserted into these little notches $t$, so as to hold the bolster $i$ at any elevation required. These pieces $s$ are intended to be applied at any desired point intermediate between the two side pieces, $b$, of the bed-bottom. With these supports thus arranged at intermediate spaces between the sides of the bed-bottom, the bolster $i$ can be made in two pieces, the same as indicated in Fig. 4, if desired.

I do not claim supporting the slats by means of springs coiled around the roller $e$. I do not claim by themselves the flexible connections $c$, nor the spring-arms $d$. My claim embraces the new combination and arrangement of devices for supporting the end of the slat and gripping or holding the same by means of the hook $h$ and the hole in the slat. By the employment of the hook and the countersink on one side of the hole in the slat, when weight is superimposed, the slat is firmly bound by the hook, and all vibratory motion of the slat or noise is thereby entirely prevented. The devices not being specifically new, the arrangement for holding the slat and the method of its operation are claimed as new. I do not claim slots sustained by stiff springs at the head and limber springs at the foot, and the devices for keeping the slat in position, as shown in the patent of R. O. Lowrey, February 11, 1868. Neither do I claim, broadly, making the head or upper end of a bed or mattress higher than the foot. Neither do I claim elevating the upper end of a mattress having jointed sides by means of a segment, holes, and pins. Neither do I claim making the head of a mattress higher than the other parts by inserting under the same longer springs than at any other part of the mattress. (See patents of August Gebhard, February 18, 1868, Philip Kraber, August 4, 1867, and the forfeited application of H. W. Axford, passed for issue March 11, 1868.) My invention is distinguishable from these, in that it consists of an elevated cross-slat, either in one or two parts, removable from the bed-frame for purposes of packing and transportation.

What I claim as my invention, and desire to secure by Letters Patent, is—

1. The combination and arrangement of the hooked springs $d$, flexible connections $c$, the peculiarly-formed support having the three hooks, one on each of the flaring ends, to enter the holes in the flexible connections, the other passing up through the holes in the slats and overlapping the tops thereof, the said support being placed underneath the slats, and the whole being arranged so that when weight is placed upon the bed the hooks $h$, pressing down upon the slats, bind them and hold them firmly, as herein set forth.

2. The elevated detachable and adjustable cross-slat $i$, in one or two pieces, as herein set forth.

JAMES POTTER.

Witnesses:
 WM. HENRY CLIFFORD,
 HENRY C. HOUSTON.